United States Patent [19]

Reeves, III et al.

[11] Patent Number: 4,630,679

[45] Date of Patent: Dec. 23, 1986

[54] METHOD FOR TREATMENT AND/OR WORKOVER OF INJECTION WELLS

[75] Inventors: Henry C. Reeves, III, Layfayette, La.; Gary F. Potter, Tulsa, Okla.; Suzanne M. Riley, Houston, Tex.

[73] Assignee: Dowell Schlumberger Incorporated, Tulsa, Okla.

[21] Appl. No.: 716,783

[22] Filed: Mar. 27, 1985

[51] Int. Cl.⁴ ............................................. E21B 43/12
[52] U.S. Cl. ................................................. 166/305.1
[58] Field of Search ...................... 166/304, 305.1, 291, 166/292

[56] References Cited

U.S. PATENT DOCUMENTS

| | | | |
|---|---|---|---|
| 4,046,197 | 9/1977 | Gruesbeck, Jr. et al. | 166/305.1 |
| 4,175,042 | 11/1979 | Mondshine | 166/305.1 |
| 4,284,140 | 8/1981 | Sudansk et al. | 166/305.1 |
| 4,369,843 | 1/1983 | Mondshine | 166/305.1 |
| 4,393,938 | 7/1983 | Lawson et al. | 166/305.1 |
| 4,399,868 | 8/1983 | Richardson et al. | 166/304 |

*Primary Examiner*—James A. Leppink
*Assistant Examiner*—William P. Neuder
*Attorney, Agent, or Firm*—L. Wayne White

[57] ABSTRACT

The non-damaging use of relatively high density calcium halide-containing brine compositions as kill weight workover fluids in high pressure water injection wells is rendered practicable via the use of an aqueous preflush composition containing an effective amount of a scale inhibitor material. In those instances where the scale inhibitor material is relatively strongly acidic in character (such as, for example, in the case of phosphonic acid materials, and the like), remarkable improvements in the injectivity of wells treated with said acidic aqueous preflush composition has also been obtained.

21 Claims, No Drawings

METHOD FOR TREATMENT AND/OR WORKOVER OF INJECTION WELLS

BACKGROUND OF THE INVENTION

The present invention relates generally to the treatment and/or workover of injection wells employed in enhanced oil recovery such as water flooding, surfactant flooding, carbon dioxide flooding, etc. In one aspect, the invention relates to a non-damaging method of utilizing relatively high density calcium halide-containing brines as kill weight fluids in the workover of high pressure injection wells employed in enhanced oil recovery operations. In another aspect, the invention pertains to a method of treating enhanced oil recovery injection wells for the purpose of improving the injectivity characteristics thereof.

In certain types of enhanced oil recovery operations, the injection fluid(s) is injected through the injection well, under elevated pressures, into the oil-bearing subterranean formations or reservoirs to force or drive residual oil deposits from the formations to strategically located producing wells within the producing field. Periodically, these injection wells must be shut down and taken out of service for various repair or workover operations. In such instances, it has been conventional practice to either employ a snubbing unit to contain or control the reservoir pressure at its normal levels during the desired repair or workover operations or to backflow the injection well of concern for an extended period of time until the hydrostatic head provided by the backflowed formation brines (typically having densities in the range of from 8.5 to 8.7 lb/gal) is sufficient to fully contain the remaining reservoir pressures (i.e., to "kill the well").

Each of the foregoing conventional techniques has certain inherent disadvantages associated therewith. Snubbing unit, for example increases the complexity and time required for workover operation and are potentially hazardous in the sense that workover operations are conducted with the reservoir fully pressurized, thereby exposing workover crew members to the possibility of serious personal injury in the event of snubbing unit failure. On the other hand, while bleeding off excess reservoir pressure (i.e., over and above that which is generated by the hydrostatic head of flowed back formation brines) generally results in relatively safer workover operations, such technique of necessity not only impairs waterflood performance for a substantial period of time (e.g, for periods reaching or exceeding several weeks or months in many instances) but also represents a very costly operation. For example, backflowed formation brine (typically several thousand barrels) has to be collected and either transported and disposed of or stored for subsequent reinjection. Additionally, lost production and substantial pumping cost are incurred in connection with reinjection of water or brine reinjection before the well can again contribute to the flooding operation.

In view of the foregoing deficiencies, it is apparent that another technique to shut down an injection well would be highly desirable.

The concept of using commercially available high density brine materials as kill weight fluids in high pressure injection wells has not been generally achievable because waterflood reservoir brines are generally incompatible with such high density brines. Calcium salts in said high density fluids tend to react with salts in the formation brines to form insoluble calcium sulfate precipitates. These precipitated salts can cause significant formation damage. In view of this incompatibility problem, high density calcium-containing brine compositions have thus far not been suitable for (nor accepted for) use as kill weight workover fluids for high pressure water injection wells. Naturally, it would be extremely desirable to provide a method or technique by which said high density brine compositions could be so used.

SUMMARY OF THE INVENTION

It has now been discovered the above-described calcium-containing brine/formation brine incompatibility problem can be suitably obviated by preceding the placement of said calcium-containing brine material with an inhibited aqueous preflush composition containing a scale inhibitor material, said preflush being employed in an amount sufficient to substantially preclude intermingling of said formation brine with said calcium-containing brine material. Accordingly, the present invention in one of its aspects is a method for shutting down for workover operations a high pressure water injection well penetrating an oil-bearing subterranean formation and used in association with an enhanced oil recovery water-flooding operation, said method A. involving the use of a relatively high density brine composition containing one or more water soluble calcium halide salts as a kill weight work-over for confinement of formation fluid pressure and B. comprising the steps of:
   a. injecting into said well an inhibited aqueous preflush composition which comprises an effective amount of a scale inhibitor material and which is employed in an amount sufficient to prevent any substantial intermingling of said formation fluids with high density brine composition; and
   b. subsequently placing said high density brine composition into said well so as to displace said preflush into said formation and to counterbalance and contain the pressurized fluids in said formation.

In connection with the foregoing, it has also been discovered that when the scale inhibitor employed in the aforementioned aqueous preflush composition is a relatively strong acidic material such as a phosphonic acid, a phosphoric acid or a phosphorous acid, remarkable improvements are obtained in the injectivity characteristics of wells tested with said preflush composition. Accordingly, in another of its aspects the present invention is also a method of increasing the injectivity of a water injection well penetrating an oil-bearing subterranean formation, said method comprising:

A. injecting into said formation an acidic aqueous scale inhibitor compositions having dissolved therein from about 0.05 to about 5 percent by weight, based upon the total weight of said composition, of an acidic scale inhibitor material selected from the group consisting of phosphonic acid materials, phosphoric acid materials and phosphorous acid materials;

B. maintaining said acidic aqueous scale inhibitor composition within said formation for a contact period of at least about 4 hours; and C. thereafter backflowing said well to remove said acidic aqueous scale inhibitor composition from said formation.

The present invention is particularly beneficial from the standpoint of eliminating the inherent safety hazards and inconvenience associated with snubbing unit usage while at the same time eliminating the need for (and costs and downtime associated with) extended backflowing and repressurization which is otherwise required when relatively low density formation brines are employed to generate the kill weight hydrostatic head needed for shut down and workover operations in the high pressure water injection wells of interest.

DETAILED DESCRIPTION OF THE INVENTION

The present invention can be suitably employed in connection with any high pressure water injection well for which it is desired to shut same down for workover operations. Thus, for example it can be used both for wells which have been completed in an open hole fashion and for those which have been equipped with a perforated liner throughout the injection zone. However, in those instances where an open hole completion has been employed, it is generally preferred to further employ a viscosified or gelled pill or slug of relatively high density brine following the indicated preflush composition and prior to the normally non-viscosified high density kill weight brine composition. In such instances it is also generally preferred to employ such viscosified or gelled pill or slug in a volume at least about equal to the open hole volume of the well concerned, which volume can, of course, be readily determined in a given instance from well log charts for same. Additionally, in those instances where such a gelled or viscosified brine pill or slug is employed following the inhibited preflush composition and wherein said preflush composition is acidic in character, it is generally advisable and preferred to employ a non-acidic aqueous spacer to separate said preflush from said gelled brine material. This latter feature is generally preferred as a safeguard against possible intermingling of said acidic preflush and said gelled brine which might in turn serve to break (i.e., reduce the viscosity of) said gelled brine material.

With regard to the foregoing, it should be noted that the use of the gelled brine slug or pill in open hole injection wells is preferred in order to reduce the risk that an initially sufficient reservoir pressure-confining hydrostatic head might be lost over time either due to dilution of the heavy brine fluid with inflowing light weight formation brines or due to leak off of the initially placed heavy brine into the formation itself. Naturally, usage of such gelled pill or slug in wells completed using perforated liners through the injection zone can provide similar benefits and/or safety factors against the potential loss of adequate hydrostatic head. Accordingly, the use of such gelled pill or slug is generally preferred in these latter types of situations as well.

Viscosifier materials suitable for use in preparing the aforementioned gelled brine slug or pill include water soluble or dispersible polymers, such as hydroxyethylcellulose, and long-chain water soluble or dispersible aliphatic amines or the amine/acid or ammonium salts thereof, such as N,N-bis(2-hydroxyethyl) erucyl amine and salts thereof (e.g. the hydrocholoride salt), N,N-bis(2-hydroxyethyl) oleyl amine and salts thereof (e.g. the acetic acid salt), N,N'-bis(2hydroxyethyl) methol oleyl ammonium chloride, and the like. For most treatments, hydroxyethlcellulose is preferred, based on its commercial availability and cost.

High density brine materials suitable for use in the present invention (and to which the present invention is applicable) are those which have one or more water soluble calcium salts (typically calcium halide salts such as $CaCl_2$, etc.) dissolved therein. Generally said brines will have a density in the range of from about 10 to about 18 lb/gal and preferably the density thereof will be from about 15 to about 18 lb/gal.

The aforementioned high density brine materials can suitably also contain water soluble salts other than, and in addition to, the above-noted calcium salts. Thus, for example, said brines can further contain sodium salts such as sodium chloride, sodium bromide, etc.; zinc salts such as zinc chloride, zinc bromide, etc.; and the like. However, in those instances wherein zinc salts such as zinc chloride or bromide are to be included, it is generally advisable and preferable to limit the amount thereof to a maximum level of about 2 weight percent or less (based upon the total weight of the brine composition) in order to minimize the risks of zinc sulfide precipitation which may otherwise occur within the formation in connection therewith.

Scale inhibitor materials suitable for use in the aforementioned aqueous preflush composition include any material whichis capable of either preventing or at least substantially reducing calcium sulfate formation and/or precipitation when the calcium-containing kill weight brine of interest is admixed with the formation brine associated with the water injection well of concern.

Preferred scale inhibitors for use herein include the various aminopoly carboxylic acids, organo phosphonates, organo phosphates and phosphate ester materials as well as the corresponding acids thereof and, as has been hereinbefore indicated, the various phosphonic, phosphoric and phosphorous acid materials are of special interest and utility in those instances wherein it is desired to substantially improve the injectivity performance of the particular water injection well or wells of concern. Some specific scale inhibitor materials of particular interest for use herein include diethylene-triaminepentamethylene phosphonic acid, ethylenediaminetetra acetic acid, and the like.

The amount of scale inhibitor employed in the indicated aqueous preflush composition is, functionally speaking, an amount sufficient to prevent, or to at least substantially reduce the degree of, scale formation (e.g., calcium sulfate precipitation) in the event that said preflush, the formation brine and the calcium-containing kill weight brine all become intermingled and admixed together. Generally speaking said amount will usually be within the range of from about 0.05 to about 5 (preferably from about 0.1 to about 2) weight percent based upon the total weight of said aqueous preflush composition.

The aqueous preflush composition preferably (but not absolutely necessarily in all cases) will also further contain an amount of an alkali metal of ammonium halide salt (preferably potassium chloride) sufficient to prevent clay swelling in the event that the formation of concern contains clays susceptible to swelling upon contact with fresh water. Typically said amount will be in the range of from about 0.5 to about 10 (preferably from about 1 to about 5 and most preferably from about 2 to about 4) weight percent based upon the total weight of said preflush composition.

The amount of the aqueous preflush employed in a given instance is that amount which is sufficient to prevent or substantially reduce intermingling of formation brine material with the calcium-containing kill weight brine composition. Generally an amount in the range of from about 200 to about 4,000 (preferably from about 800 to about 2,000) gallons of said preflush will be adequate for such purpose.

In the practice of the present invention involving the use of the above-indicated preflush material and a relatively high density calcium-containing brine to shut down and work over a high pressure water injection well, it is generally preferred to back flow the well for a brief period of time prior to injecting the aqueous preflush and the kill weight brine therein. This is generally preferable in order to clear out debris from the near well bore area and it has been found also to substantially increase the quality of near well bore area formation brines and to thereby further reduce the risks or magnitude of scale precipitation within the formation during said workover operation. As has been noted, the flowback period for this purpose can be fairly brief and, indeed, backflowing for a period of as little as from about 1 hour to about 3 days (preferably for a period of 24 hours or less) is generally adequate for the present purposes.

As has been noted above, one embodiment of the present invention involves the use of an acidic aqueous scale inhibitor composition (i.e., of the sort described hereinbefore as a heavy brine preflush material) for the specific purpose of improving the injectivity generally of water-flood related enhanced oil recovery water injection wells. In this regard, it is to be noted that this particular embodiment of the present invention can be suitably practiced in connection with the heavy brine kill weight fluid aspect hereof, or not, as may be desired in a given instance. That is, such injectivity improvement aspect can, when desired, stand alone and can be separately practiced in conjunction with previously known, conventional water injection well shut down-/workover techniques (e.g., snubbing unit usage, or prolonged backflow until natural shut down via formation brine hydrostatic head). In any event, the acidic aqueous scale inhibitor composition employed in this instance will generally contain from about 0.05 to about .5 (preferably from about 0.1 to about 2) weight percent (on a total aqueous inhibitor composition basis) of an acidic scale inhibitor material selected from the group consisting of the various phosphonic, phosphoric and phosphorous acid materials and will preferably also contain one or more of the aforementioned ammonium or alkali metal halide salts in the amounts hereinbefore noted for insurance against clay swelling in potentially fresh water sensitive formations. When such acidic aqueous scale inhibitor compositions are employed for the indicated injectivity in contact with the portion of the formation to be so treated for a period of at least about 4 hours. Preferably said contact period will be at least about 24 hours (e.g., from about 1 to about 3) days in duration.

The practice of the present invention is further illustrated by reference to the following examples thereof.

EXAMPLE 1

A water injection well located in Lea County, N.M., was treated according to the present invention. In this treatment, 50 barrels (42 gallons; per barrel [bbl.]) of an aqueous preflush comprising 2 weight percent potassium chloride and 1 volume percent of diethylenetriaminepenta methylene phosphoric acid was pumped through the wellbore and into the formation at a pump rate of 1 bbl./minute; the instantaneous shut in pressure increased from 850 psig to 1300 psig. The well was then shut in for two days while additional materials and equipment were moved to the well site. Subsequently, a "pill" of viscosified high density brine (13 gallons of oleyl methyl bis(2-hydroxyethyl) ammonium chloride mixed with 20 bbls. of 14.3 lbs/gal $CaCl_2/CaBr_2$ brine) was injected into the wellbore at 0.75 bbl/min. for 20 minutes. Then 15 bbls. of a clean non-viscosified high density brine (14.3 lbs/gal) was pumped into the wellbore to fill the tubing. At this point, the tubing was "dead"; i.e., the formation pressure was neutralized or off-set by the hydrostatic pressure of the weighted brine in the wellbore. Pressure was then applied down the backside of the tubing (i.e., the annulus region) and weighted brined (14.3 lbs/gal) was pumped into the annulus at a rate of 1 to 1.25 bbls/min. until the well was dead. At this point, the packer in the well was released and the packer and tubing were removed from the well, a scraper was run through the casing and new tubing and a new packer were inserted while the well remained filled with weighted brine. The weighted brine above the packer was then displaced with a conventional packer fluid (4 weight percent aqueous Kcl containing a commercial oxygen scavenger and corrosion inhibitor) by pumping the packer fluid through the tubing to a point just above the packer and then up the annulus at a pump rate of 1.25 bbls/min. and 500 psig. The displaced weighted brine was collected for reuse on another well. The next day, the well was opened to flow back the viscosified weighted brine pill which was heavily contaminated with iron sulfide scale and other pacticulate debris. This workover procedure was a safe efficient operation and, as an added benefit, the production data on the well indicated that production of hydrocarbons was modestly stimulated by the procedure. The acidic nature of the preflush caused it to interact with material(s) in the perforations and near wellbore to clean the formation and increase the permeability of the formation.

What is claimed is:

1. A method for shutting down a high pressure injection well penetrating a subterranean formation, said method involving the use of a relatively high density brine composition containing one or more water soluble calcium halide salts as a kill weight work-over fluid for confinement of formation fluid pressure and comprising the steps of:
   a. injecting into said well an aqueous preflush composition which comprises an effective amount of a scale inhibitor, said preflush composition being injected in an amount sufficient to prevent any substantial intermingling of said formation fluids with said high density brine composition;
   b. injecting after said aqueous preflush composition and ahead of said calcium halide containing kill weight brine composition a slug of an aqueous viscosified brine in an amount at least about equal to the open hole volume of said injection well; and
   c. subsequently placing said high density brine composition into said well so as to
      (1) displace said preflush into said formation;
      (2) to displace said viscosified brine slug into the open hole portion of said injection well, and
      (3) to counterbalance and contain the pressurized fluids in said formation.

2. The method of claim 1 which further comprises a preliminary step of backflowing the injection well prior to injecting said inhibited aqueous preflush composition therein.

3. The method of claim 2 wherein the backflow period is about 24 hours or less such that hydrostatic head provided by the formation fluids is insufficient to fully contain the remaining reservoir pressures.

4. The method of claim 1 wherein the aqueous preflush composition has dissolved therein from about 0.5 to about 10 percent by weight, based upon the total weight of said preflush composition, of an alkali metal or ammonium halide salt.

5. The method of claim 4 wherein said alkali metal or ammonium halide salt is potassium chloride and/or sodium chloride.

6. The method of claim 4 wherein the amount of alkali metal or ammonium halide salt employed is from about 1 to about 5 weight percent, based upon the total weight of said aqueous preflush composition.

7. The method of claim 4 wherein the amount of alkali metal or ammonium halide salt employed is from about 2 to about 4 weight percent, based upon the weight of said aqueous preflush composition.

8. The method of claim 1 wherein said high density brine composition has a density of from about 10 to about 18 pounds per gallon.

9. The method of claim 1 wherein said scale inhibitor is at least one organo phosphonate, phosphate, phosphate ester and/or the corresponding acids thereof.

10. The method of claim 9 wherein the scale inhibitor is employed in an amount of from about 0.05 to about 1.2 volume percent, based upon the total volume of said aqueous preflush composition.

11. The method of claim 9 wherein the scale inhibitor material is employed in an amount of from about 0.1 to about 1.0 volume percent, based upon the total volume of said aqueous preflush composition.

12. The method of claim 1 wherein an aqueous spacer is injected between the inhibited aqueous preflush and the viscosified brine composition.

13. A method of treating a well shut in by the method of claim 1 which comprises the further step of displacing said high density brine from the well to the surface using a packer fluid.

14. The method of claim 13 wherein said packer fluid is an aqueous fluid containing sodium chloride and/or potassium chloride.

15. The method of claim 14 wherein said packer fluid has a density of from about 8 to about 10 pounds per gallon.

16. The method of claim 13 wherein said high density brine is recovered.

17. The method of claim 13 which further comprises backflowing the well until all or substantially all of said preflush composition and viscosified brine have been displaced and returned to the surface.

18. A method for shutting down a high pressure injection well penetrating a subterranean formation, said method involving the use of a relatively high density brine composition containing one or more water soluble calcium halide salts as a kill weight work-over fluid for confinement of formation fluid pressure and comprising the steps of:
 a. injecting into said well an aqueous preflush composition which comprises an effective amount of a scale inhibitor, said preflush composition being injected in an amount sufficient to prevent any substantial intermingling of said formation fluids with said high density brine composition; and
 b. subsequently placing said high density brine composition into said well so as to
  (1) displace said preflush into said formation; and
  (2) to counterbalance and contain the pressurized fluids in said formation.

19. The method of claim 18 which further comprises a preliminary step of backflowing the injection well prior to injecting said inhibited aqueous preflush composition therein.

20. The method of claim 19 wherein the backflow period is about 24 hours or less such that the hydrostatic head provided by the formation fluids is insufficient to fully contain the remaining reservoir pressures.

21. The method of claim 18 wherein the aqueous preflush composition had dissolved therein from about 0.5 to about 10 percent by weight, based upon the total weight of said preflush composition, of an alkali metal or ammonium halide salt.

* * * * *